United States Patent Office 3,014,708
Patented Dec. 26, 1961

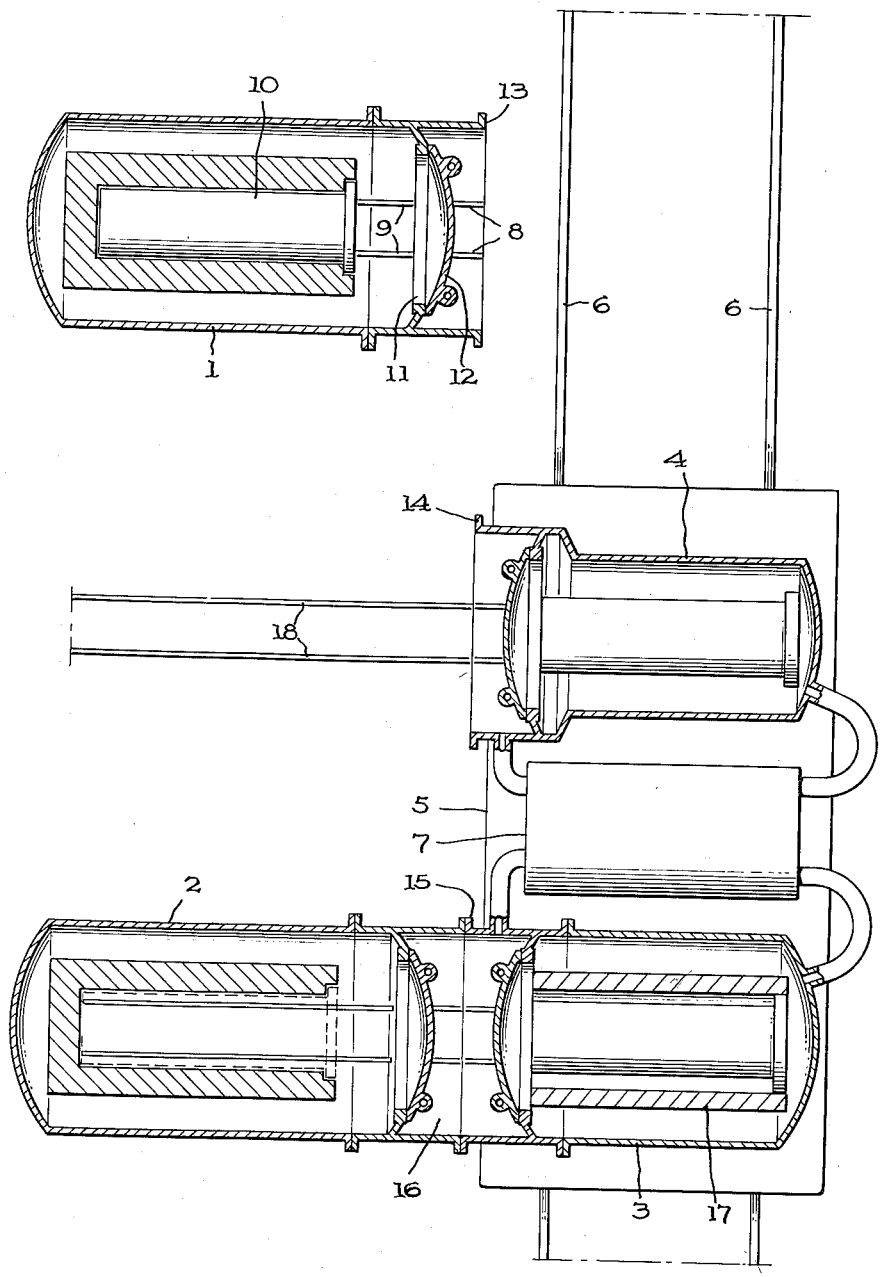

3,014,708
PROCESS AND APPARATUS FOR SUBJECTING MATERIALS IN THE SOLID STATE TO HIGH TEMPERATURES AT SUB-ATMOSPHERIC PRESSURES
Elis Erik Vilhelm Helin, Goteborg, Sweden, assignor to Elektriska Svetsningsaktiebolaget, Goteborg, Sweden, a corporation of Sweden
Filed Nov. 18, 1958, Ser. No. 774,754
Claims priority, application Sweden Nov. 18, 1957
2 Claims. (Cl. 266—5)

The present invention relates to a process and apparatus for subjecting materials in the solid state to high temperatures at sub-atomespheric pressures. In this context, high temperatures should be understood to mean any temperatures above 500° C. but below the fusing temperature of the material treated, and sub-atmospheric pressures should be understood to comprise any pressures substantially below the atmospheric pressure, particularly pressures in the range from about 10 mm. mercury down to small fractions of a millimeter mercury. More particularly, the invention relates to a vacuum furnace heating process in which the vacuum furnace is maintained at sub-atmospheric pressure throughout the treatment of a series of charges, means being provided for allowing the introduction of each of the charges into the furnace and removal of the charge from the furnace without loss of vacuum in the furnace. The materials treated may be homogeneous substances, for instance alloys, or they may be mixtures.

Examples of such processes are metal producing processes in which a mixture of metal oxide and carbon is heated at sub-atmospheric pressures to a temperature below the melting points of the metal oxide and of the metal produced. Another example is the decarburizing of comminuted metals, for instance high-carbon ferrochromium, by the process of heating a mixture of the comminuted metal to be decarburized and an oxidizing agent, which latter may have the shape of a layer of oxide formed on the individual metal particles through an oxidizing treatment preceding the vacuum furnace heating. While the invention is primarily concerned with the examples mentioned, it is not limited thereto but may also be applied to processes in which a solid charge is to be heated at sub-atmospheric pressures in order to obtain, for instance, a de-gassing of the charge, or a distillation or a sublimation serving to extract desirable products from the charge or to remove undesirable products therefrom, or a recrystallization or a conversion into another structural modification, etc.

At present, processes involving the heating in vacuo of comminuted materials have found little practical application. One reason for this is that conventional vacuum furnaces for large charges have a comparatively low production capacity, largely owing to the long time required for heating the charge to the desired temperature, the conduction of heat through the comminuted mass being slow.

The invention has for its principal object to provide a process for the general purpose indicated in which the production capacity, or useful working time, of the vacuum furnace is considerably increased, resulting in a considerable improvement of the economy of the process. The invention also has for its object the provision of improved apparatus particularly adapted for carrying out the novel process.

According to a principal feature of the invention, the charge to be treated in the vacuum furnace is introduced into the vacuum furnace in a preheated condition. The preheating may be carried up to the working temperature, that is, the temperature at which the charge is required to be held in the vacuum furnace. Preferably the charge should be preheated to a temperature of not less than 500° C. in order to realize the full advantages of the invention. The preheating of the charge may be carried out in air, if the charge is of such a nature that no oxidization will occur at the preheating temperature, or if some oxidization is allowable or desirable. In other cases, some non-oxidizing gas or gas mixture will have to be employed. The furnace used for preheating the charge may be of any suitable type. The rotary furnace of the interior combustion type may be particularly mentioned on account of its ability to perform swift and uniform heating of a large charge of comminuted material. In a particular mode of carrying out the invention, the preheating of the charge is performed in the auxiliary container, or lock chamber, provided for allowing the introduction of the charge into the vacuum furnace proper without loss of vacuum in the latter. In other words, the auxiliary container or lock chamber referred to is made to perform the additional function of a preheating furnace. In the operation of a plant of this type, care should be taken not to start exhausting the auxiliary container until the charge has reached the desired preheating temperature of not less than 500° C., as otherwise the preheating period will be unduly extended.

Other objects, features and advantages of the invention will be apparent from the following particular description and from an inspection of the accompanying drawing showing somewhat diagrammatically a horizontal view of a vacuum furnace plant which may be employed to carry out the process features of the present invention and which embodies the structural features of the invention. The furnaces and the auxiliary containers forming part of said plant are represented in horizontal section.

The plant shown comprises two vacuum furnaces 1, 2 and two auxiliary containers, to wit, one charging container 3 and one discharging container 4. The furnaces 1, 2 are stationary and are connected to a common vacuum pump unit or, preferably, to individual pump units (not shown). The containers 3, 4 are mounted on a platform 5 displaceable along a pair of rails 6. The platform 5 also carries a vacuum pump unit 7 for exhausting either or both of the auxiliary containers. The vacuum furnaces 1, 2 are each provided with a track or runway formed by pipes or bars 8, 9 for a car or trough 10 containing the charge to be treated, as well as with mechanism (not shown) for pushing said car into or out of the furnace. The furnaces are provided at one end with a charging orifice 11 adapted to be closed by a vacuum-tight sliding cover 12 and with a flange 13 adapted to make a vacuum-tight connexion with a corresponding flange 14 or 15 on the container 4, 3 respectively, so as to form a hermetical seal against the outer atmosphere for the passage 16 provided for the car 10 between the charging orifices of the furnace and the container. Similar sliding covers are provided for the orifices of the containers 3, 4. Each of the containers 3, 4 is displaceable a short distance in a direction at right angles to the rails 6, whereby the flange 14 or 15 can be carried into or out of engagement with the flange 13 of either of the furnaces 1, 2. The sliding covers of the furnaces and the containers are adapted to be raised and lowered by mechanism (not shown) operable from outside the furnaces or containers. In the raised position of the covers, the orifices give free access for the car 10 and the charge supported thereon. Heating of the charge in the vacuum furnaces is effected by a set of resistor elements supported by the furnace lining and also by a set of resistor elements supported by the car 10 itself. As said resistor elements, with their attaching means and electrical connexions, may be of various designs well-known to those skilled in the art, I have refrained from showing them in the drawing. In the charging container 3 as well, means (not shown) are provided for the supply of current to the resistor elements disposed on the car, so that a preparatory heating of the charge can be carried out in the charging container 3. Said container is provided with a heat insulating lining 17 on which a set of additional heating resistors (not shown) may be mounted.

As a starting point for describing the operation of the vacuum furance plant shown, let it be assumed that both of the vacuum furnaces 1, 2 are occupied by a charge, and that the charge contained in furnace 2 is due for replacement prior to the one contained in furnace 1. Containers 3, 4 are as yet empty. A charge car loaded with a charge to be treated, for instance a charge of superficially oxidized high-carbon ferrochromium particles, is conveyed to the plant along track 18, and the platform 5 is adjusted so as to place the charging container 3 in position for receiving said charging car. The car with its charge is pushed into the container 3, the container is closed, and heating of the charge is started immediately. Next, the platform is shifted so as to place the discharging container 4 in register with the furnace 2. The vacuum-tight connexion between flanges 13 and 14 is established, and exhaustion of the passage 16 and the container 4 is started. As soon as the pressure has decreased to the level of the pressure in the furnace 2, the sliding covers of the furnace and the container are raised, and the car is shifted from the furnace to the container. The sliding covers are then lowered, the pressure in the passage 16 is allowed to rise to the atmospheric pressure by the admission of atmospheric air thereto, and the engagement of flanges 13 and 14 is undone. The next step will be shifting of the platform so as to place the charging container 3 in register with the furnace 2, and connecting the container 3 and the furnace 2 to each other. The drawing shows the plant at this stage of the operations. As soon as the temperature of the charge contained in the charging container has reached the desired level, for instance 800° C., the container 3 as well as the passage 16 are exhausted to substantially the same level as the vacuum furnace, the sliding covers are raised, the car with its charge are shifted from the charging container to the furnace, the sliding covers are lowered again, and air is admitted into the passage between the covers to allow disengagement of the charging container from the furnace.

As soon as the charge contained in the container 4 has cooled off sufficiently to be subjected to the atmospheric air without undesirable oxidization or other harmful effects, the container 4 is opened. Prior to opening the container, a non-oxidizing gas, for instance carbon monoxide, hydrogen or nitrogen, may be admitted into the container in order to speed up the cooling process by the creation of interior convection currents. The car is removed along track 18. Furnace 1 will now be in turn for discharging and recharging by the same sequence of operations as above described in relation to furnace 2.

The cycle of operations and the general arrangement above schematically described should be taken as an example only. For any individual case, the time required by each of the operations (heating, exhausting, holding at high temperature, cooling etc.) should be taken into account and the sequence of operations adjusted accordingly in such a manner that the furnaces are never empty and are never occupied by a charge for a longer time than the one required for the treatment of the same. For instance, with two furnaces more than two charging containers may be required to keep the furnaces fully occupied. Alternatively, a special preheating furnace, for instance a rotary furnace, may be employed for heating the charge prior to its introduction in the charging container.

I claim:

1. A vacuum furnace plant for subjecting a comminuted charge of solid material to high temperatures at sub-atmospheric pressures, comprising a pair of movable charge carriers, a vacuum furnace adapted to accommodate either of said movable charge carriers and having a single orifice for insertion and withdrawal of said charge carriers, a pair of movable containers each of which is adapted to accommodate either of said charge carriers, means for sealing off either of said movable containers against the outer atmosphere, means independent of said vacuum furnace for evacuating either of said movable containers and means for establishing a sealed-off path between either of said movable containers and the vacuum furnace so as to permit the transfer of either of said movable charge carriers from the vacuum furnace to the container and vice versa while maintaining a sub-atmospheric pressure in the furnace and the container, and means for heating the charge prior to its introduction into the vacuum furnace.

2. A vacuum furnace plant as described in claim 1 including movable platform means for supporting both of said containers and said evacuating means for said containers and for aligning either of said containers with said vacuum furnace orifice.

References Cited in the file of this patent

UNITED STATES PATENTS

| | | |
|---|---|---|
| 2,233,474 | Dreffein | Mar. 4, 1941 |
| 2,446,403 | Bassereau | Aug. 3, 1948 |
| 2,787,536 | Spedding et al. | Apr. 2, 1957 |
| 2,878,008 | Ishizuka | Mar. 17, 1959 |

UNITED STATES PATENT OFFICE
CERTIFICATE OF CORRECTION

Patent No. 3,014,708                            December 26, 1961

Elis Erik Vilhelm Helin

It is hereby certified that error appears in the above numbered patent requiring correction and that the said Letters Patent should read as corrected below.

In the grant, line 1, name of inventor, for "Elis Erik Vihelm Helin" read -- Elis Erik Vilhelm Helin --; column 1, line 14, for "sub-atomespheric" read -- sub-atmospheric --; column 2, line 39, after "individual" insert -- vacuum --; column 3, line 9, for "furance" read -- furnace --; column 4, lines 38 to 40, strike out ", and means for heating the charge prior to its introduction into the vacuum furnace".

Signed and sealed this 29th day of May 1962.

(SEAL)
Attest:

ERNEST W. SWIDER                                  DAVID L. LADD
Attesting Officer                                       Commissioner of Patents